W. BIRD.
OVEN.
APPLICATION FILED NOV. 7, 1916.
1,239,341.
Patented Sept. 4, 1917.
2 SHEETS—SHEET 1.
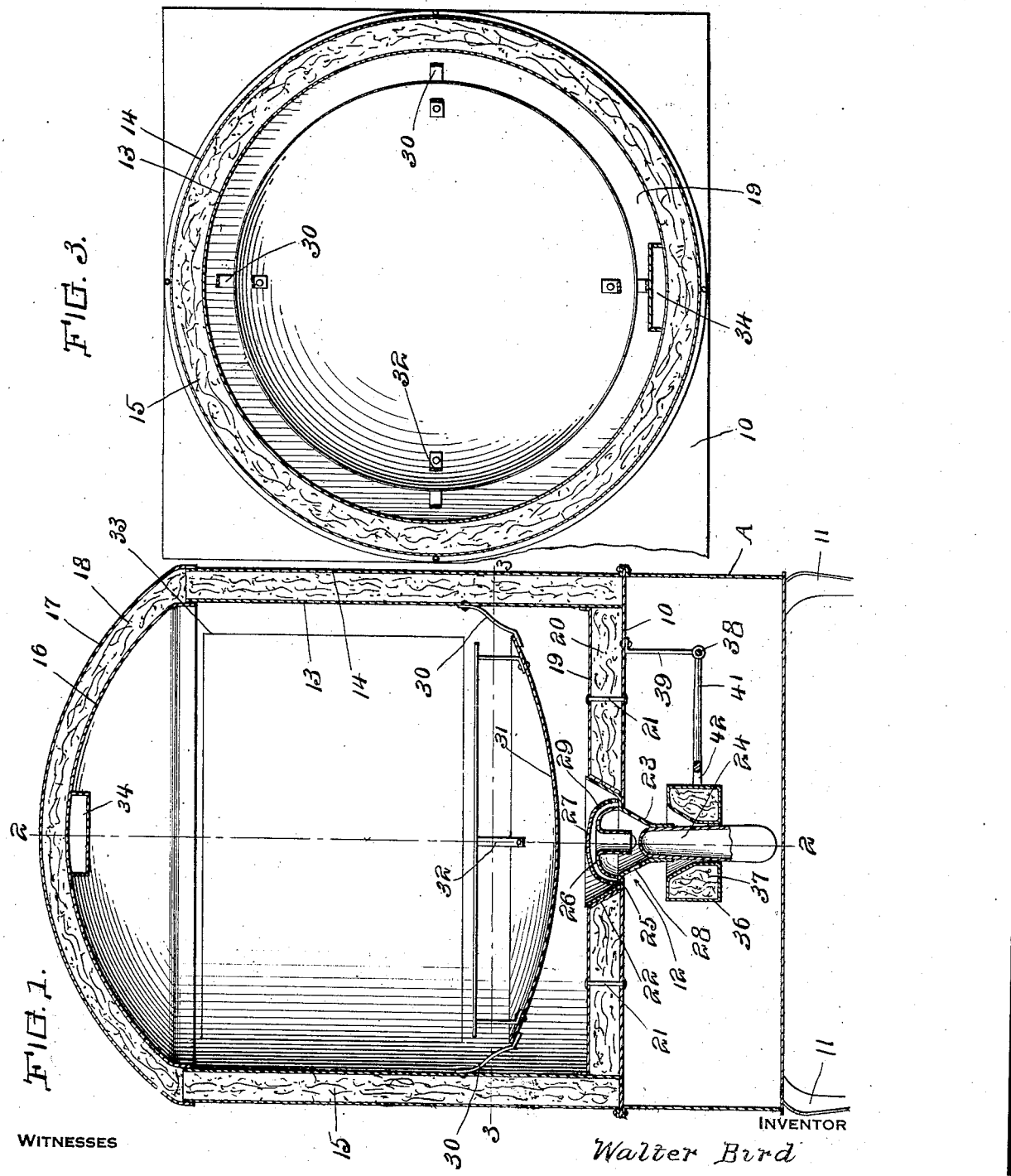
WITNESSES
A. C. Newkirk
Edward Geages
INVENTOR
Walter Bird
BY Victor J. Evans
ATTORNEY

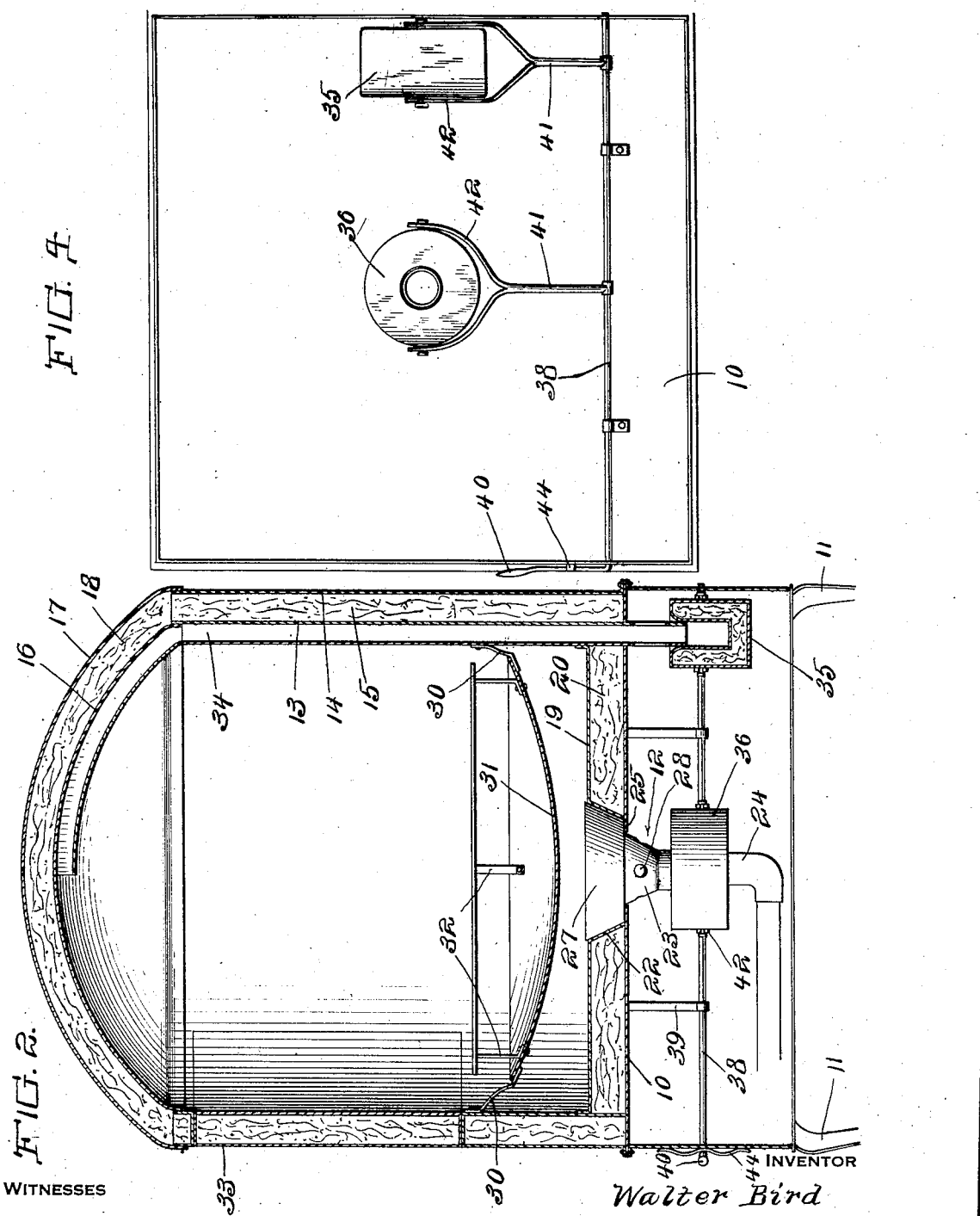

UNITED STATES PATENT OFFICE.

WALTER BIRD, OF CINCINNATI, OHIO.

OVEN.

1,239,341. Specification of Letters Patent. Patented Sept. 4, 1917.

Application filed November 7, 1916. Serial No. 130,040.

*To all whom it may concern:*

Be it known that I, WALTER BIRD, a citizen of the United States, residing at Cincinnati, in the county of Hamilton and State of Ohio, have invented new and useful Improvements in Ovens, of which the following is a specification.

This invention relates to ovens, and aims to provide a device of this character that is initially heated, preferably through the medium of a suitable oil or gas burner, the oven being designed to maintain a constant temperature for a considerable length of time, subsequent to the discontinuance of the burner, thus permitting of its use in the capacity of what is generally known as a "fireless cooker."

More specifically stated the invention embodies an exhaust flue leading from within the oven to the atmosphere through the bottom of the oven, together with caps for closing respectively the said flue, and the air inlet openings of the burner, when use of the oven as a fireless cooker is desired, during which time the burner of course is discontinued.

In carrying out the invention I provide a means for simultaneously adjusting said caps to either their opened or closed positions, and holding the same in closed position to effectively seal the oven against the introduction of air thereinto.

The nature and advantages of the invention will be better understood when the following description is read in connection with the accompanying drawings, the invention residing in the construction, combination and arrangement of parts as claimed.

In the drawings forming part of this specification like numerals of reference indicate similar parts in the several views and wherein:—

Figure 1 is a vertical sectional view with the oven constructed in accordance with my invention.

Fig. 2 is a sectional view taken on line 2—2 of Fig. 1 and at right angles thereto.

Fig. 3 is a horizontal sectional view taken on line 3—3 of Fig. 1.

Fig. 4 is a bottom plan view.

An oven constructed in accordance with my invention is designed primarily for use in connection with an oil or gas stove, the latter being indicated generally at A and embodying a top 10 supported by the legs 11 and a burner indicated generally at 12. The oven is preferably of circular formation, although it can be varied in design, but embodies inner and outer spaced walls 13 and 14 respectively, the space between these walls being filled with heat insulating material 15 of any suitable character. The oven is provided with a cover which is also made up of spaced inner and outer walls 16 and 17 respectively, the space between these walls being also filled with heat insulating material 18, the cover being removably associated with the oven and resting upon the upper edge thereof in a manner to prevent the escape of heat. A plate 19 is arranged within the oven and spaced a distance from the top 10 of the stove approximately equal to the distance between the respective walls of the oven proper, and this space is filled with heat insulating material 20, the plate 19 being supported and braced by means of the elements 21. The plate 19 is also provided with a central opening coinciding with the opening in the top 10 of the stove for the introduction of the burner 12, and the edge of the plate 19 adjacent its opening is bent downwardly as at 22 to rest against the top 10 of the stove and thereby assist the elements 21 in supporting the plate in proper position. It might here be stated that the burner indicated generally at 12 forms no part of the invention, but embodies a substantially conical shaped member 23 which embraces the tip 24, and has a portion projecting through the opening in the stove 10, and offset as at 25 to define a shoulder upon which rests a baffle 26 inclosed by a cap 27. The baffle 26 is formed with an opening disposed in axial alinement with the tip 24 of the burner, while the conical shaped member 23 is provided with enlarged air intake openings 28 disposed with relation to the baffle 26 so that the air entering the burner passes directly through the flame. It will be manifest that the air is deflected by the baffle 26 and caused to take an irregular course to its escape through the openings 29 in the cap 27, by reason of which fact the air is intensely heated prior to its introduction into the oven.

Depending from the inner wall 13 and at diametrically opposite points, are brackets 30 having their lower extremities offset and extending toward each other to provide a support for a heat distributing member 31. This member as illustrated is disposed immediately above the burner, and is curved or dished in a manner to equally distribute the heat about the interior of the oven, thus causing the heat to circulate about the contents of the latter as will be readily understood. Secured to the member 31 and rising therefrom at diametrically opposite points are standards 32 which support a rack or tray for the cooking utensils. It might here be stated that the oven is provided with a door 33 which is curved to conform to the configuration of the oven, and forms a part of the body thereof when closed. The door by reason of its arrangement permits ready access to be had to the interior of the oven, and may be held in its closed position in any suitable manner. An exhaust flue 34 is arranged beneath the cover with one end disposed approximately centrally thereof, the flue being extended beneath the cover and downwardly along the inner wall of the oven through the top 10 of the stove, opening to the atmosphere. Obviously the heat enters the oven at the bottom thereof, and subsequent to its circulation about the contents of the oven, it is discharged to the atmosphere through the exhaust flue 34.

However in addition to providing the heat insulating material about the walls of the oven for the purpose of retaining the heat therein, I also provide a means for sealing the exhaust flue 34 and the air inlet openings 28 of the burner, so that the oven can be converted into a "fireless cooker" when desired. It is of course to be understood that the oven must be first initially supplied with heat from the burner, and when the inlet openings 28 thereof and the exhaust flue 34 are sealed in the manner to be presently described, the burner may be discontinued as the heat will be confined within the oven, whereby the latter will maintain a constant temperature for a considerable length of time.

In carrying this idea into effect I preferably make use of a cap 35 constituting a closure for the exhaust flue 34, and a similar cap 36 which is adapted to close the air inlet openings 28 of the burner. These caps may vary in construction, but are preferably double walled and provided with heat insulating material 37. The cap 36 as shown is mounted upon the tip 24 of the burner for sliding adjustment thereon. To effect a simultaneous adjustment of these caps, a rod 38 is journaled beneath the top 10 of the stove in suitable bearings 39, one extremity of the rod projecting beyond the stove and formed to provide a manipulating handle 40 disposed at right angles to the rod as shown. Projecting laterally from the rod 39 are spaced parallel extensions 41, each having a forked extremity 42 between the branches of which one of the respective caps is pivotally mounted. From this construction and arrangement it will be noted that by rotating the rod in one direction the respective caps 35 and 36 are elevated to their active position for the purpose above described, and by rotating the rod 39 in the opposite direction the respective caps are lowered to an inactive position. Secured to the outer wall 14 of the oven at an appropriate point, is a serpentine resilient element 44 which is adapted to engage the handle or manipulating portion 40 of the rod when in one of its positions, with a view of holding the rod fixed in this position and the respective caps 35 and 36 effectively closed to prevent the escape of heat from the oven through the exhaust flue 34 and the air inlet openings 28. The adjustment of these parts is easily effected, the oven in its entirety being simple in construction and very efficient for the purposes intended.

While it is believed that from the foregoing description the nature and advantages of the invention will be readily apparent I desire to have it understood that what is herein shown is merely illustrative of one embodiment of the invention to which I do not limit myself, and that such changes may be resorted to as desired, that fall within the scope of what is claimed.

What is claimed is:—

1. An oven having heat insulating walls, and an opening in the bottom thereof for the reception of a burner provided with air intake ports, a removable cover, an insulated cap slidably mounted upon the burner, and means for adjusting the cap to close said ports and prevent the escape of heat from the oven when desired.

2. An oven having heat insulating walls, and an opening in the bottom for the reception of a burner provided with air intake ports, a removable cover, an exhaust flue arranged within the oven and communicating with the atmosphere, and caps slidably mounted upon the burner and flue respectively for sealing said flue and intake ports of the burner to prevent the escape of heat from the oven when desired.

3. An oven having heat insulating walls, and an opening for the reception of a burner provided with air intake ports, a removable cover, an exhaust flue arranged within the oven and having one end communicating with the atmosphere in juxtaposition with said burner, caps slidably mounted upon the burner and flue respectively, and means for simultaneously adjusting said caps to seal said flue and said intake ports to prevent the escape of heat from the oven.

4. An oven having heat insulating walls, and an opening for the reception of a burner provided with air intake ports, a removable cover, an exhaust flue arranged within the oven having one end communicating with the atmosphere, insulated caps slidably mounted upon the burner and flue respectively, a shaft journaled for rotation, arms projecting from said shaft and supporting said cap, a handle for manipulating the shaft to simultaneously adjust said caps for sealing said flue and air intake ports of the burner, and yieldable means engaging said handle to hold the caps fixed in their adjusted position.

In testimony whereof I affix my signature.

WALTER BIRD.

Copies of this patent may be obtained for five cents each, by addressing the "Commissioner of Patents, Washington, D. C."